United States Patent [19]
Shank

[11] 3,763,600
[45] Oct. 9, 1973

[54] CARRIAGE POSITIONING DEVICE FOR A GRINDING MACHINE

[75] Inventor: William E. Shank, Waynesboro, Pa.

[73] Assignee: Landis Tool Company, Waynesboro, Pa.

[22] Filed: Apr. 21, 1972

[21] Appl. No.: 246,173

[52] U.S. Cl. .................. 51/105 SP, 51/216 ND
[51] Int. Cl. ............................................ B24b 5/42
[58] Field of Search ................. 51/105 R, 105 SP, 51/105 EC, 837 CS, 216 ND

[56] References Cited
UNITED STATES PATENTS

| R24,091 | 11/1955 | Rocks | 51/105 SP |
| 2,708,816 | 5/1955 | Balsiger | 51/105 SP |
| 3,118,258 | 1/1964 | Price | 51/105 SP |
| 3,690,070 | 9/1972 | Ohta | 51/105 SP |

Primary Examiner—Donald G. Kelly
Assistant Examiner—Howard N. Goldberg
Attorney—Joseph R. Spalla

[57] ABSTRACT

An apparatus for controlling the longitudinal positioning of a carriage in a grinding machine which grinds the crankpins of small crankshafts. A spacing bar is employed which has wide notches formed therein so that each side of each notch serves as a separate locating surface for positioning a crankpin diameter. A plurality of spaced grinding wheels may be used.

6 Claims, 3 Drawing Figures

PATENTED OCT 9 1973 3,763,600
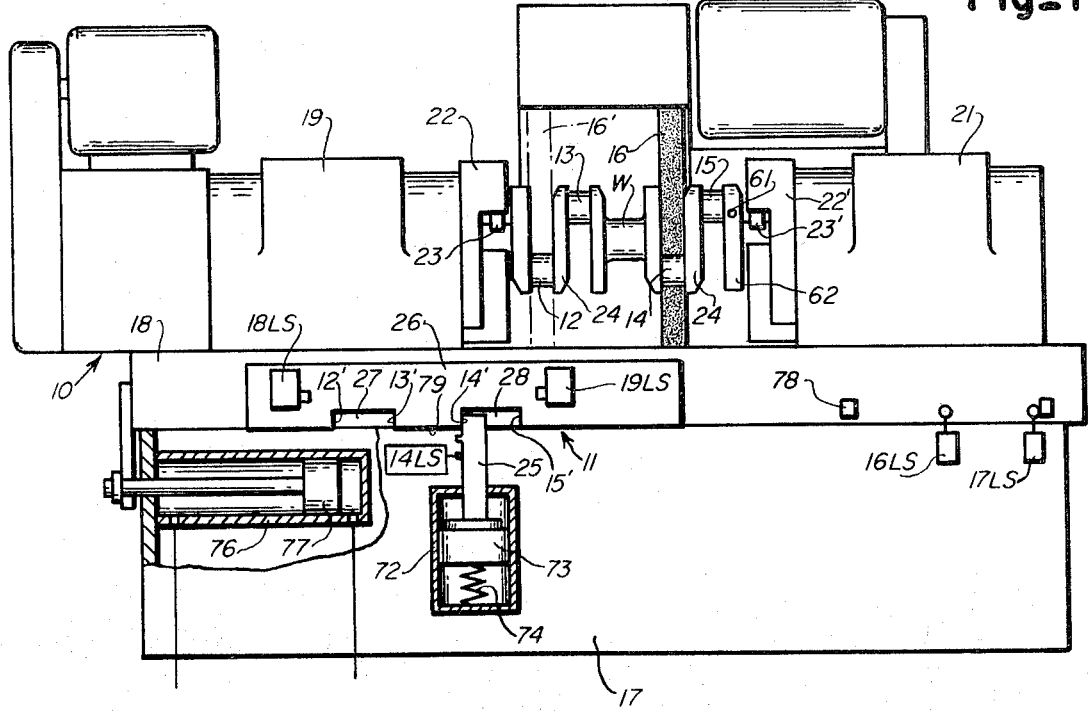
Fig_1
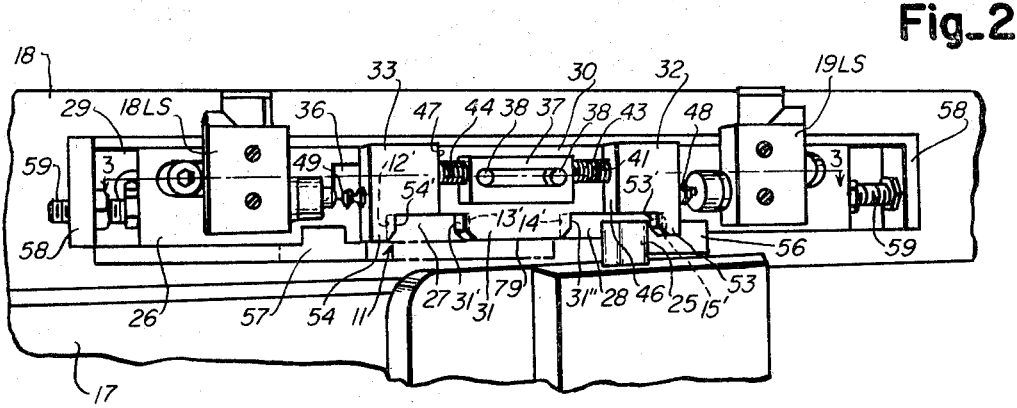
Fig_2
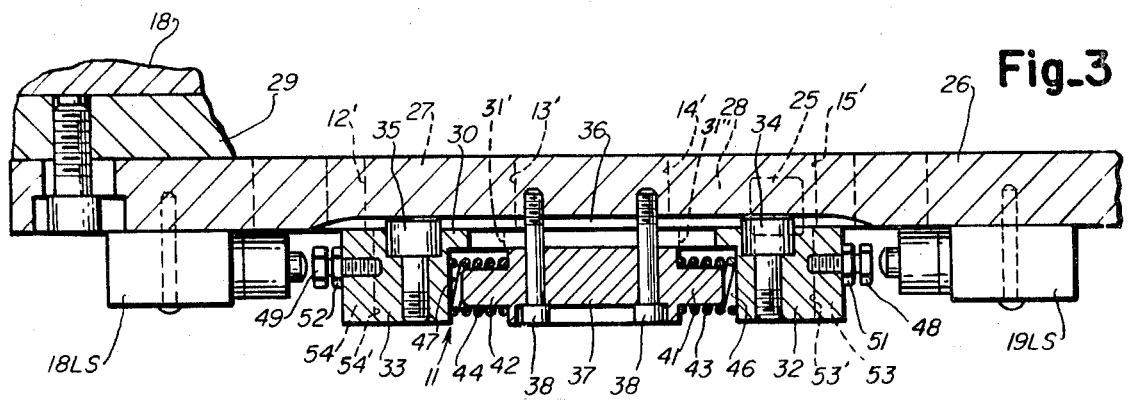
Fig_3 ial positioning of a carriage to align successive crankpin diameters with a grinding wheel was determined by a spacing bar and plunger arrangement. The spacing bar included a notch for each crankpin diameter to be ground, and the size of the plunger was reduced in size when the spacing of the crankpin diameters were axially spaced close together. In some cases, the width of the plunger was reduced to a point where deflection of the plunger occurred and some crankshafts were not able to be longitudinally positioned automatically for this reason.

CARRIAGE POSITIONING DEVICE FOR A GRINDING MACHINE

BACKGROUND OF THE INVENTION

1. Field of the Invention

During the grinding of crankpins on semi-automatic or automatic crankpin grinding machines, it is necessary that successive crankpin diameters be axially aligned with the face of a grinding wheel. This invention relates to new and useful improvements in a locating mechanism for positioning a carriage so that crankpin diameters which are axially spaced close to one another may be properly positioned. The positioning device uses a spacing bar having notches which receive a plunger, but the positioning is determined by using each side of the notch to provide the desired position.

2. Description of the Prior Art

Prior to this invention, the axial positioning of a carriage to align successive crankpin diameters with a grinding wheel was determined by a spacing bar and plunger arrangement. The spacing bar included a notch for each crankpin diameter to be ground, and the size of the plunger was reduced in size when the spacing of the crankpin diameters were axially spaced close together. In some cases, the width of the plunger was reduced to a point where deflection of the plunger occurred and some crankshafts were not able to be longitudinally positioned automatically for this reason.

In prior U.S. Pats., Reissue 24,091, granted Nov. 22, 1955 and 3,118,258, granted June 21, 1964, a spacing bar was used which included a notch for each crankpin diameter being ground. The crankshaft ground on this machine was of conventional size and the notches were axially spaced a distance to permit a plunger of sufficient width and rigidity to be used.

SUMMARY OF THE INVENTION

In the preferred embodiment, the spacing bar includes wide notches so that the correct positioning of the carriage is determined by engagement of the plunger with the side of the notch which corresponds with the respective crankpin diameter to be ground. The spacing bar is secured to the carriage and carries a slidably mounted plate having switch blocks at each end thereof. The plate is retained in a central position by a key block which includes a coil spring at each end in engagement with the switch blocks. This arrangement provides a signal that the plunger is in the correct position so that the grinding cycle can be started.

It is, therefore, an object of the present invention to provide a novel positioning mechanism for effecting precise axial positioning of a carriage to align a workpiece portion, such as a crankpin diameter of a crankshaft with a grinding wheel.

Another object of this invention is the provision of a spacing bar and plunger arrangement, wherein axial positioning is determined by using the side of a notch to permit crankshafts having crankpin diameters which are closely spaced axially to be accurately positioned.

Another object is to provide a spacing bar and plunger arrangement which permits the use of a plunger having a width of sufficient size to prevent deflection.

Another object is to provide means to receive an electrical signal when the plunger has engaged the proper side of the notch so that the cyclic operation of the machine can be effected.

Another object is to provide a locating mechanism for axially positioning a carriage of a crankpin grinder with such precise accuracy that the sidewalls of the crankpin diameters to be ground will be centrally located for equal stock removal.

Another object is to provide a locating mechanism for axially positioning a carriage of a crankpin grinder which can be used on a machine having a single grinding wheel for grinding each crankpin diameter independently or for a machine having two spaced wheels so that two crankpin diameters in the same plane may be ground simultaneously.

The above and other features and advantages of the present invention will become better understood from the detailed description of the invention that follows when considered in connection with the accompanying drawings.

BRIEF DESCRIPTION OF THE DRAWINGS

FIG. 1 is a front view of a crankpin grinding machine, showing the positioning device, crankshaft, and a schematic diagram for moving the carriage;

FIG. 2 is an enlarged perspective view of the positioning device showing the spacing bar, plunger, and operating switch arrangement for controlling the end points for the cyclic positioning of the carriage to align the crankpin diameters axially with the grinding wheel; and FIG. 3 is a sectional plan view taken generally along the line 3—3 of FIG. 2, illustrating the detailed construction of the positioning device.

DETAILED DESCRIPTION OF THE INVENTION

A conventional crankpin grinder 10 is shown in FIG. 1 which incorporates a carriage positioning device 11 in accordance with the present invention. The carriage positioning device 11 is used for determining the end points of longitudinal movement to align crankpin diameters 12, 13, 14 and 15 with a grinding wheel 16.

The crankpin grinder 10 includes a bed member 17 which supports a work carriage 18 mounted for longitudinal movement thereon. A crankshaft W is rotatably supported on the carriage 18 in crankheads 19 and 21. A crank carrying fixture 22 and 22' is secured to the crankheads 19 and 21 respectively, and clamp arms 23 and 23' are used to clamp the workpiece W in a conventional manner.

It is conventional practice to use a spacing bar 143 as shown in previously mentioned U.S. Reissue Pat. No. 24,091, granted Nov. 22, 1955. A separate notch 144a, 144b, 144c and 144d was provided for each crankpin diameter of a 4-throw crankshaft. The cyclic operation of the machine included the longitudinal movement of the carriage from one notch to the next to place successive crankpin diameters in operative relation with the grinding wheel 130.

The crankshaft W (FIG. 1) includes four crankpin diameters 12, 13, 14, and 15. The crankpin diameters 12 and 13 are axially spaced and in common planes with the crankpin diameters 14 and 15, respectively. Each of these diameters 12, 13, 14 and 15 represent successive diameters of the crankshaft and are axially spaced apart the distance of a narrow web portion 24 (FIG. 1). This spacing is too narrow to permit a plunger 25 of sufficient size and rigidity to engage individual notches for each of the crankpin diameters 12, 13, 14 and 15.

It can be seen by FIG. 2 that a spacing bar 26 only includes two spaced notches 27 and 28 which define locating surfaces 12', 13', 14' and 15' to limit the movement of the carriage 18 for the crankpin diameters 12, 13, 14 and 15 respectively. The positioning device 11 obtains a precise end point of carriage movement when the plunger 25 contacts the surfaces 12' and 13' of the notch 27 and the surfaces 14' and 15' of the notch 28. An electrical signal is obtained through limit switch 18LS or 19LS when the respective end point of the carriage movement is reached, as the switches 18LS and 19LS are secured to the spacing bar 26.

constructing the spacer bar 26 and the plunger 25, certain calculations must be made, as follows. The distance between locating surface 12' and 14' (FIGS. 1 and 3) should equal the distance between the left hand side of pin 12 and the left hand side of pin 14 (or the distance between the centers of pins 12 and 14). The distance between surface 12' and 13' should equal the distance between the left hand side of pin 12 and the left hand side of pin 13 plus the width of the plunger 25. In this manner, the relative movement between the spacing bar 26 and the plunger 25, when the plunger is disengaged from the surface 12' and engaged with the surface 13', is equal to the distance between the centers of the pins 12 and 13. The distance between surfaces 14' and 15' is obtained in the same manner as the distance between surfaces 12' and 13'.

If the width of the plunger 25 is increased in order to gain more rigidity, the surfaces 12' and 15' must be moved outwardly by a like amount to the left and right, respectively. Likewise, the distance between surfaces 13' and 14' must be decreased by the same amount the plunger width is increased. All of the above comments assume that the dimensions of the crankshaft W remain constant.

A spacing bar carrier 29 is secured to the carriage 18 in a conventional manner and the spacing bar 26 is secured to the carrier 29 by conventional fasteners (unnumbered). A switch actuating member 30 having portions 31, 32 and 33 projecting therefrom, is slidably mounted to the spacing bar 26 by cam rollers 34 and 35. The cam rollers are retained in a longitudinal track 36 machined in the side of the spacing bar 26. The switch member 30 is retained in a central or free position by means of a block 37 which is secured to the spacing bar 26 by fasteners 38. Protruding bosses 41 and 42 are formed on each end of the block 37 and carry coil springs 43 and 44 which abut adjacent surfaces 46 and 47 of the portions 32 and 33.

Adjusting screws 48 and 49 are carried by the portions 32 and 33 and locking nuts 51 and 52 are used to prevent undesired movement of the screws 48 and 49. Each of the portions 32 and 33 includes an extended portion 53 and 54 which is inwardly offset a small amount from the outer surfaces 12' and 15' of the notches 27 and 28 to define surfaces 53' and 54' respectively. The portion 31 defines surfaces 31' and 31" which are outwardly offset a small amount from the inner surfaces 13' and 14' of the notches 27 and 28 respectively.

The above arrangement permits a signal from the limit switch 18LS when the carriage 18 is moved to the right to position the crankpin diameters 12 or 14 in axial alignment with the grinding wheel 16. The crankpin diameter 12 is aligned with the grinding wheel 16 when the plunger 25, which is in the notch 27, engages the surface 54'. The crankpin diameter 14 is aligned with the grinding wheel 16 when the plunger 25, which is in the notch 28, engages the surface 31". A signal is obtained from the limit switch 19LS when the carriage 18 is moved to the left to position the crankpin diameters 13 and 15 in axial alignment with the grinding wheel 16. The plunger 25, which is in notch 27, will engage the surface 31' to provide a signal that the crankpin diameter 13 is in axial position with the grinding wheel 16. A signal from the limit switch 19LS is also obtained when the plunger 25, which is in the notch 28, engages the surface 53' to signify that the crankpin diameter 15 is in axial alignment with the grinding wheel 16.

The operating switch member 30 moves with the carriage 18 until the plunger 25 restricts movement thereof to the right or left, depending upon the direction of carriage movement. When the carriage 18 is advanced to the left for aligning the crankpin diameter 15 with the grinding wheel 16, the plunger 25 will be advanced into the notch 28 and will engage the surface 53' of the actuating switch member 30. The actuating switch member 30 will be restrained against movement and the switch member 19LS will engage the adjusting screw 48 to provide a signal that the crankpin diameter 15 is in axial alignment with the grinding wheel 16. The relative movement between the spacing bar 26 and the actuating switch member 30 is permitted by the compressing of the coil spring 44. The carriage 18 is now positioned in the extreme left position and the grinding of the crankpin diameter 15 can be automatically effected.

A stop member 56 is secured to the R.H. (right hand) end of the spacing bar 26 to provide a solid stop to prevent any overtravel of the carriage 18 to the left beyond the notch 28. A stop member 57 (FIG. 2) limits the amount of overtravel of the carriage 18 to the right beyond the notch 27.

End caps 58 (FIG. 2) are secured to the ends of the carrier 29 to provide means to alter and lock the spacing bar 26 in a precise axial position during set-up through adjusting screws 59 in a conventional manner.

The carriage positioning device 11 may be used on crankpin grinding machines 10 which are furnished with two spaced grinding wheels 16 and 16'. The grinding wheels 16 and 16' are axially spaced an amount equal to the spacing of the crankpin diameters 12 and 14 which is the same as the spacing between the crankpin diameters 13 and 15. The stop member 57 is mounted in an opposite direction as shown by the dotted line in FIG. 2 when two grinding wheels 16 and 16' are utilized. The stop member 57 provides a stop to prevent overtravel of the carriage 18 to the right beyond the notch 27.

When two grinding wheels 16 and 16' are used, two crankpin diameters 12 and 14 or 13 and 15, are ground simultaneously and the end points for locating the carriage 18 are determined by the surfaces 14' and 15' of the single notch 28.

OPERATION

The operation of the positioning device 11 is automatically effected during the cycle of a semi-automatic machine which may utilize a form of manual indexing (not shown). The crankshaft W as shown in FIG. 1, includes four crankpin diameters 12, 13, 14 and 15 with the crankpin diameters 12 and 14 angularly spaced 180° from the crankpin diameters 13 and 15.

A locating pad 61 (FIG. 1) may be formed on the counterweight 62 to provide a single locating point for angularly positioning the crankshaft W between a first and a second angular position for the respective set of in-line crankpin diameters 12 and 14 or 13 and 15 in a conventional manner.

The positioning device 11 may also be utilized on completely automatic machines, such as the machine described in detail in the previously mentioned U.S. Pat. No. 3,118,258, granted Jan. 21, 1964. On machines of this type, the automatic rotary indexing of the crankshaft W is effected to cause relative rotation between the crankshaft W and the crank carrying fixture 22 and 22' to position one of the crankpin diameters 12, 13, 14 and 15 in the correct angular position for grinding. This movement is effected while the carriage 18 is being longitudinally positioned to align the corresponding crankpin diameters 12, 13, 14 or 15 into axial alignment with the grinding wheel 16.

The description which follows covers the automatic axial positioning of the carriage 18 following a set-up operation to align the crankpin diameter 13 into axial alignment with the grinding wheel 16. The carriage 18 is positioned to the right or left until the plunger 25 has engaged the notch 27. The carriage 18 should be moved until the plunger 25 contacts the surface 13' of the notch 27 by rotating a manual handwheel (not shown) for the initial condition.

The automatic cycle is now started, wheel rotation begins and the crankshaft W is positioned axially and radially to precise limits by conventional positioning devices (not shown). The clamp arms 23 and 23' are closed by hydraulic means and the grinding wheel 16 is advanced through variable speeds until the crankpin diameter 13 is ground to size as determined by an in-process gage (not shown) in a conventional manner. The grinding wheel 16 is retracted, the feed mechanism is reset, and work rotation is stopped.

The plunger 25 (FIGS. 1, 2 and 3) is retracted by fluid pressure which is directed to the rod end of a hydraulic motor or cylinder 72. A piston 73 is lowered, which contracts a compression spring 74. A limit switch 14LS (FIG. 1) is energized by the lowering of the plunger 25 to provide a signal to direct fluid pressure into the head end of a hydraulic motor or cylinder 76. The cylinder 76 is secured to the bed member 17, and a piston 77 within the cylinder 76 is coupled to the carriage 18 (FIG. 1).

The piston 77 is advanced to the left when fluid pressure is directed to the head end of the cylinder 76 and the carriage 18 is moved to the left at a rapid rate. Limit switch 16LS is deenergized by a lug 78 (FIG. 1) which is secured to the carriage 18, when the carriage 18 has moved the crankshaft W away from the position for grinding the crankpin diameter 13, and the limit switch 19LS is deenergized. As the carriage 18 moves further to the left, a limit switch 17LS is energized to effect a reduced rate of carriage traverse; fluid pressure to the rod end of the cylinder 72 is blocked, and the spring 74 raises the plunger 25 against a portion 79 of the spacing bar 26. 28

The plunger 25 enters the notch 28 when the carriage 18 is moved further to the left and the switch 14LS provides a signal that the plunger 25 is fully reset. The carriage 18 continues movement to the left until the plunger 25 contacts the surface 53' which retains the actuating switch member 30 against movement to the left. The limit switch 19LS is closed by contact with the adjusting screw 48 which indicates that the carriage 18 has positioned the crankpin diameter 15 in axial alignment with the grinding wheel 16, and fluid pressure to the head end of the cylinder 76 is blocked.

The clamp arms 23 and 23' are opened, and the crank-shaft W is positioned angularly and axially to precise tolerances to insure that the crankshaft W is properly positioned. The clamp arms 23 and 23' are closed, work rotation is effected, and the grinding wheel 16 is advanced to grind the crankpin diameter 15 to size in a conventional manner.

The crankpin diameters 14 and 12 are ground successively in a manner similar to the grinding of the crankpin diameters 13 and 15 after the crankshaft W is radially indexed. The crankpin diameter 14 is automatically positioned into axial alignment with the grinding wheel 16 by directing fluid pressure to the rod end of the cylinder 76. The carriage 18 will be advanced to the right and the surface 31" of the actuating switch member 30 is contacted by the plunger 25 which prevents the actuating switch member 30 from further movement to the right.

Movement of the carriage 18 to the right continues until the limit switch 18LS contacts the adjusting screw 49 to provide a signal that the crankpin diameter 14 is in axial alignment with the grinding wheel 16. Fluid pressure to the rod end of the cylinder 76 is then blocked by control means (not shown).

The grinding of the crankpin diameter 14 is accomplished in a conventional manner until size is reached. The plunger 25 is retracted and the carriage 18 is advanced to the right to position the crankpin diameter 12 in axial alignment with the grinding wheel 16 to permit the grinding of the crankpin diameter 12.

The carriage 18 is traversed to the left following the grinding of the crankpin diameter 12. Movement is effected until the plunger 25 contacts the surface 54' of the notch 27. The actuating switch member 30 is restrained against movement, and the limit switch 18LS will be closed by contacting the adjusting screw 49 to provide a signal that the carriage 18 is in the original set-up position with the crankpin diameter 13 in axial alignment with the grinding wheel 16. The crankshaft W is unloaded and an unground crankshaft is placed in the grinding machine 10, wherein the above cycle is repeated.

It is to be understood that only a preferred embodiment of the invention has been specifically illustrated and described, and variations may be made thereto without departing from the invention, as defined in the appended claims.

I claim:

1. A grinding machine comprising
    at least one grinding wheel mounted for rotational displacement about the axis thereof,
    means for mounting a crankshaft having at least two axially spaced crankpins so that the axes of the crankpins and the axis of said grinding wheel are substantially parallel,
    means for radially displacing said grinding wheel relative to the crankshaft for selectively grinding a crankpin radially aligned therewith, base means including
a plunger element,
means for biasing said plunger element in a predetermined direction, and
means for supporting said mounting means for selective displacement in a direction parallel to the axis of said grinding wheel,
said mounting means including at least one notch,
said notch having a predetermined location and being selectively configured so that said plunger element can be inserted therein and so that when said plunger element is inserted into said notch, displacement of said mounting means in a first direction will locate said plunger element at a first position against one side wall of said notch with one of the crankpins radially aligned with said grinding wheel and displacement of said mounting means in a second direction opposite to said first direction will locate said plunger element at a second location against a second side wall of said notch with the second one of the crankpins radially aligned with said grinding wheel, and
means for axially displacing said plunger element from said first position to said second position while said plunger element is maintained within said notch.

2. A grinding machine according to claim 1, wherein said mounting means includes a plurality of notches each having a predetermined location and being selectively configured so that said plunger element may be sequentially inserted thereinto and so that when said plunger element is inserted into any one of said notches, displacement of said mounting means in a first direction will locate said plunger element at a first position against one side wall of said notch with one of the crankpins radially aligned with said grinding wheel and displacement of said mounting means in a second direction opposite to said first direction will locate said plunger element at a second location against a second side wall of said one notch with another one of the crankpins radially aligned with said grinding wheel,
said axially displacing means comprising means for displacing said plunger element from said first to said second position while said plunger element is maintained within any one of said notches.

3. A grinding machine according to claim 1, wherein said mounting means further comprises a spacer bar having said notch defined therein.

4. A grinding machine according to claim 1, further comprising means for selectively withdrawing said plunger element from said notch.

5. A grinding machine comprising
at least one grinding wheel mounted for rotational displacement about the axis thereof,
means for mounting a crankshaft having at least four axially spaced crankpins so that the axis thereof and the axis of said grinding wheel are parallel,
means for radially displacing said grinding wheel relative to the crankshaft for selectively grinding a crankpin axially aligned therewith,
base means including
a plunger element,
means for advancing said plunger element in a predetermined direction from a first position to a second position,
means for retracting said plunger element in a direction opposite to said predetermined direction from said second position to said first position, and
means for supporting said mounting means for selective displacement parallel to the axis of said grinding wheel,
said mounting means including at least two notches,
said two notches having predetermined locations and being selectively configured,
so that said plunger element can be advanced and thereby inserted into said notches,
so that when said plunger element is inserted into one of said notches displacement of said mounting means in a first direction will locate said plunger element at a first position against one side wall of said one notch with one of the crankpins radially aligned with said grinding wheel,
so that after retraction of said plunger element out of said one notch and after subsequent insertion into said second notch further displacement of said mounting means in said first direction will locate said plunger element at a second position against one side wall of said second notch with a second one of the crankpins radially aligned with said grinding wheel,
so that subsequent displacement of said mounting means, when said plunger element is inserted into said second notch, in a second direction opposite to said first direction will locate said plunger element at a third position against a second side wall of said second notch with a third crankpin radially aligned with said grinding wheel,
so that after said plunger element has been again inserted into said first notch continued displacement of said mounting means in said second direction will locate said plunger element at a fourth position against a second side wall of said one notch with a forth crankpin radially aligned with said grinding wheel, and
means for displacing said plunger element from said second position to said third position while said plunger element is maintained within said second notch.

6. A grinding apparatus according to claim 5, further comprising means for changing the direction of said mounting means after the second crankpin has been axially aligned with said grinding wheel.

* * * * *